June 14, 1938.     E. G. FRUSHOUR     2,120,893
STRAINER LID FOR MILK PAILS
Filed Sept. 16, 1935
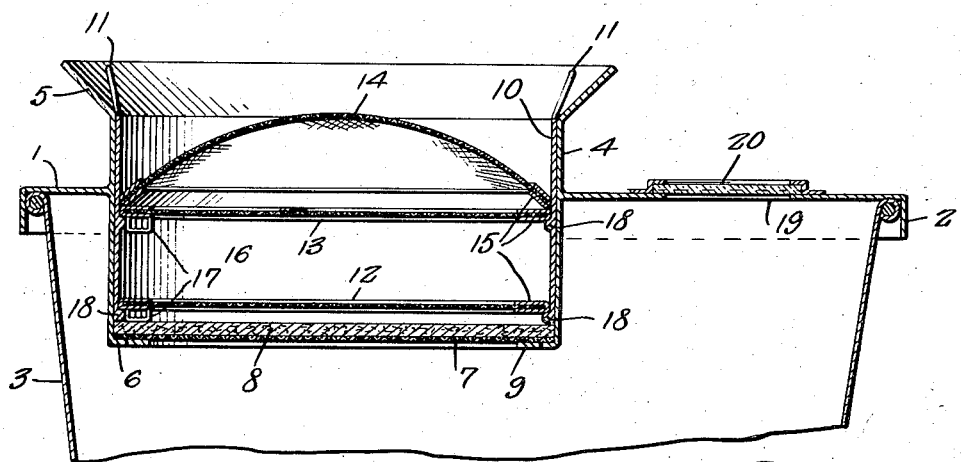
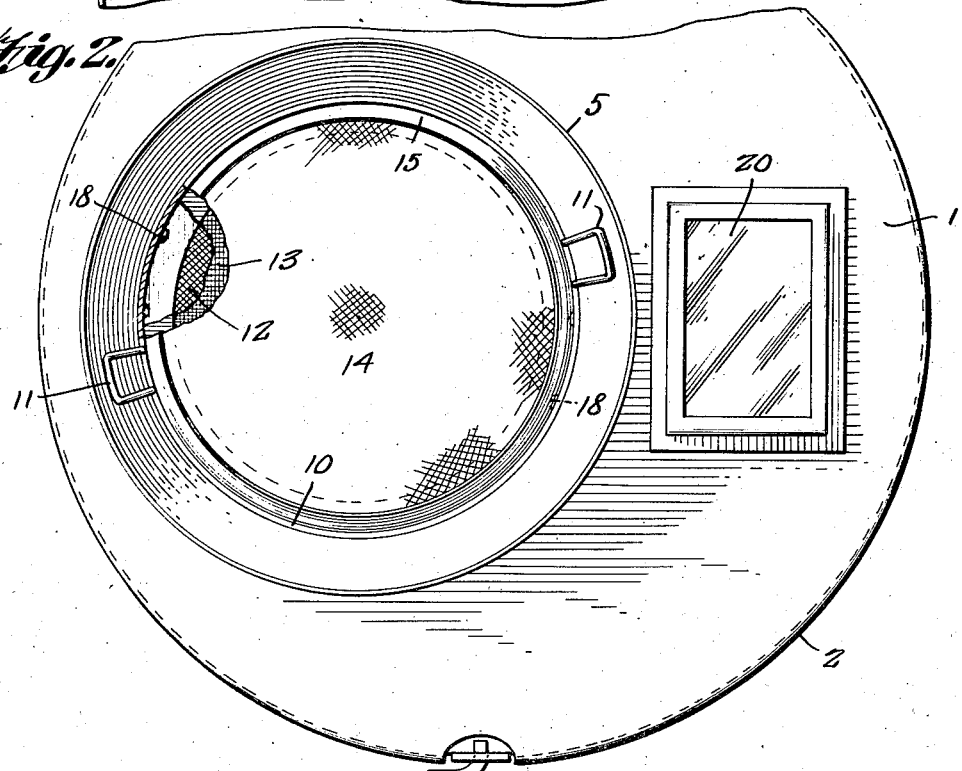
Earle G. Frushour,
INVENTOR
BY Victor J. Evans & Co.
ATTORNEYS Patented June 14, 1938

2,120,893

UNITED STATES PATENT OFFICE 2,120,893

STRAINER LID FOR MILK PAILS

Earle G. Frushour, Beatrice, Nebr.

Application September 16, 1935, Serial No. 40,812

1 Claim. (Cl. 31—51)

This invention relates to a combined lid and strainer for milk pails, and has for the primary object of the invention the provision of a device of this character which may be readily adapted to a pail for permitting milking directly into the pail with exclusion of foreign matter and which will efficiently strain the milk prior to reaching the pail to thoroughly remove foreign matter therefrom and which may be easily removed from the pail and taken apart to permit thorough cleansing thereof.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary vertical sectional view showing a combined lid and strainer for a milk pail and constructed in accordance with my invention.

Figure 2 is a fragmentary top plan view, partly in section, illustrating the same.

Referring in detail to the drawing, the numeral 1 indicates a lid having a marginal flange 2 and adapted to rest upon a pail 3 with the flange arranged externally of said pail to exclude foreign matter to the pail.

A cylindrical body 4 is formed integrally with the lid 1 and protrudes beyond opposite faces of the lid so that when the latter is applied to the pail 3, the body depends a short distance into the pail. The body is arranged vertically when the lid is applied to the pail and the outer end of said body terminates in a flared flange 5. The inner end of the body is equipped with an inwardly extending flange 6 forming a seat for a strainer element 7 on which rests a filtering pad 8 constructed of any suitable fibrous material. The strainer element 7 is constructed of a metallic foraminous material and preferably of a small mesh. An annular member 9 is secured to the strainer element 7 to abut the flange 6 for aiding in retaining the strainer element in position within the body 4. The body 4 is located in the lid to one side of the center of said lid and receives therein a sleeve 10 having frictional contact with the walls of the body and resting upon the filtering pad 8. Handles 11 are provided on the sleeve to facilitate the application and removal of the sleeve from the body. The sleeve 10 forms a removable support for a triple strainer consisting of strainer elements 12, 13 and 14. The strainer elements 12, 13 and 14 are constructed of metallic foraminous material equipped with metallic bindings 15. The strainer elements 12, 13 and 14 are removably secured in the sleeve 10 and the strainer element 12 is located in close proximity to the inner end of the sleeve so that a small space will be provided between the pad and the strainer element 12. The strainer element 13 is located a distance from the strainer element 12 to provide a chamber 16. The strainer element 14 is of semispherical shape and is arranged on the strainer element 13 in an inverted position. The strainer elements 12 and 13 are provided with handles 17 to facilitate the removal and application of said strainer elements to the sleeve after the latter's removal from the body 4. Projections 18 are arranged in the sleeve 10 to form retainers for the strainer elements 12, 13 and 14, said elements having notches to permit removal thereof from the sleeve 10.

The lid 1 is provided with an opening 19 closed by a transparent panel 20 providing a window so that the person may readily determine the amount of milk in the container.

In operation, the lid is applied to the pail 3 and has a snug fit with the latter and during milking, the milk is directed into the body 4, striking the strainer element 14 which breaks the milk into a fine spray with the foreign matter and foam collecting upon the upper surface of the strainer element. The milk passing through the straining element is again strained by the straining element 13 and enters the chamber 16 and gradually passes through the straining element 12 to contact the pad 8. Milk seeps through the pad 8 and strainer element 7 into the pail. The milk as it enters the pail has all of the foreign matter, such as dirt, foam and the like removed therefrom. After the pail 3 is substantially filled with milk the lid may be readily applied to a second pail, permitting the milking operation to be continued with a minimum loss of time of changing the lid from one pail to another. After the milking has been completed, the lid may be readily cleaned and also the strainer elements as well as the pad 8 can be removed from the body 4 for cleaning permitting the device to be easily kept in a highly sanitary condition.

Having described the invention, I claim:

A combined lid and strainer comprising a lid member having a marginal flange, a cylindrical member extending through opposite sides of said lid member, an inwardly projecting annular flange carried by one end of said cylindrical member, a flared flange carried by the opposite or outer end of said cylindrical member, an inner disk-shaped strainer member seated on said first flange, a fibrous strainer pad resting on said strainer element, a sleeve loosely disposed within said cylindrical member and seating at its inner end on said pad, strainer elements carried by said sleeve, and opposed handles carried by the outer end of said sleeve.

EARLE G. FRUSHOUR.